United States Patent [19]

Sasaki et al.

[11] Patent Number: 4,606,048
[45] Date of Patent: Aug. 12, 1986

[54] RADIO COMMUNICATION SYSTEM

[75] Inventors: Susumu Sasaki, Fujisawa; Hiroshi Nakamura, Sagamihara, both of Japan

[73] Assignee: Fujitsu Limited, Kawasaki, Japan

[21] Appl. No.: 594,987

[22] Filed: Mar. 29, 1984

[30] Foreign Application Priority Data

Apr. 6, 1983 [JP] Japan ................................. 58-59227
Apr. 6, 1983 [JP] Japan ................................. 58-59228

[51] Int. Cl.[4] .......................... H04L 5/12; H04L 23/02
[52] U.S. Cl. ........................................... 375/39; 381/4; 370/76
[58] Field of Search ................ 375/39, 61, 77, 78; 370/20, 76; 455/60; 381/4

[56] References Cited

U.S. PATENT DOCUMENTS

| | | | |
|---|---|---|---|
| 3,249,730 | 11/1974 | Ho | 375/77 |
| 3,311,828 | 3/1967 | Chasek | 375/77 |
| 3,312,901 | 4/1967 | Becker et al. | 375/77 |
| 3,835,391 | 9/1974 | Fang | 375/61 |
| 4,090,145 | 5/1978 | Webb | 375/77 |
| 4,262,360 | 4/1981 | Bigo et al. | 375/77 |

Primary Examiner—Robert L. Griffin
Assistant Examiner—Stephen Chin
Attorney, Agent, or Firm—Staas & Halsey

[57] ABSTRACT

A radio communication system includes a transmitter unit, a radio transmission line and a receiver unit. The transmitter unit contains an insertion circuit for inserting one or two signals for carrier recovery into a modulated wave signal. Each signal for carrier recovery has a frequency $(f_O + f_{CL})$, where $0 < |k| < 1$. The receiver unit receives, via the radio transmission line, the modulated wave signal, provided with the signals for carrier recovery therein. The receiver unit recovers, from the received signal, the frequency components $f_O$ and $f_{CL}$ and thereby reproduces the original data signal supplied to the transmitter unit with the use of the thus recovered frequency components $f_O$ and $f_{CL}$.

18 Claims, 15 Drawing Figures

RADIO COMMUNICATION SYSTEM

BACKGROUND OF THE INVENTION

1. Field of the Invention

The present invention relates to a radio communication system in which data is transmitted on a radio transmission line.

2. Description of the Prior Art

In a radio communication system in which data is transmitted on a radio transmission line from a transmitter unit and the transmission data is demodulated and reproduced in a receiver unit, a carrier signal is digitally modulated according to data to be transmitted. A variety of methods have been proposed and put into practical use for such digital modulation. The present invention relates primarily to a quadrature amplitude modulation (QAM) method.

In a QAM radio commmunication system, the carrier is modulated in phase and, at the same time, in amplitude according to data to be transmitted. The data is thereby transmitted as one of many corresponding coded points arranged on an imaginary plane. This enables a large amount of data to be transmitted at one time and thus significantly increases the transmission capacity of a radio transmission line.

According to the QAM method, many coded points corresponding to data are created, as mentioned above. The number of coded points may be 16, 32, 64, and sometimes as much as 128 and so on. In the QAM method, one of the significant functions of the receiver unit is the recovery of a reference carrier from the transmission signal, which is used for synchronous detection. That is, the thus recovered carrier is used to demodulate the transmission data and reproduce the original data.

The most frequently used QAM method is the 16-level method. In this case, a process identical to a known process under a typical 4-phase phase shift keying (PSK) method is usually utilized for recovering the reference carrier. That is, the so-called multiply method, such as the two-multiply or four-multiply method, may be used for realizing the process. In this case, a phase selection control process is performed in a carrier recovery circuit of the receiver unit.

In the higher level QAM methods, such as the 16-level method, a problem arises when using the prior art carrier recovery circuit in suppressing so-called jitter (fluctuation) of the reference carrier. With 32-, 64- and 128-level QAM methods, recovery of a carrier for synchronous detection, using the prior art carrier recovery circuit, is impossible for all intents and purposes.

In view of the above, it is desired to realize a QAM radio communication system for a multilevel QAM method of 32-level or higher.

SUMMARY OF THE INVENTION

Accordingly, it is an object of the present invention to provide a radio communication system operated under a QAM method of 32-level or higher.

The above object is basically attained by the following. The radio communication system operated under the QAM method includes a transmitter unit, for modulating a digital data signal having a clock frequency $f_{CL}$ with a carrier having a frequency $f_O$ and transmitting the thus modulated wave signal over a radio transmission line, and a receiver unit, for receiving, via the radio transmission line, the modulated wave signal, extracting the reference carrier and reproducing the original digital data signal with the use of the thus extracted carrier. The transmitter unit includes an insertion circuit for inserting at least one signal for carrier recovery into the modulated wave signal. The carrier recovery signal has a frequency $(f_O + f'_{CL})$, where the frequency $f'_{CL}$ is defined as $|k| \cdot f_{CL}$ $(0 < |k| < 1)$. The receiver unit includes an extraction circuit for extracting the frequency components $f_O$ and $f'_{CL}$, a separation circuit for separating the frequency components of $f_O$ and $f'_{CL}$ from each other, a recovery circuit for recovering the original frequency component $f_{CL}$ from the component $f'_{CL}$ and thereby reproducing the original digital data signal, with the use of the thus recovered frequency components of $f_O$ and $f_{CL}$, from the received modulated wave signal.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Before describing the preferred embodiments of the present invention, an explanation will be given of the prior art for reference.

Figure 1:
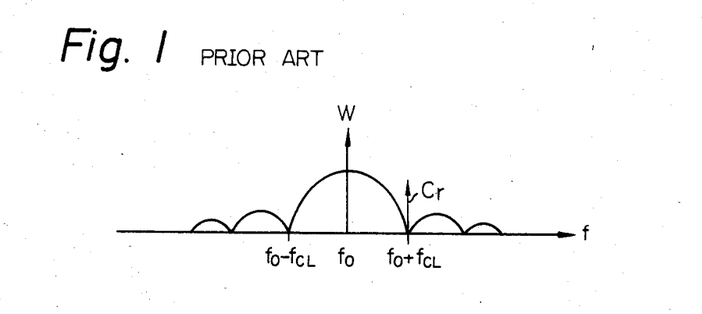
FIG. 1 is a graph of a spectrum of a conventional modulated wave signal transmitted from a transmitter unit.

FIG. 1 is a graph of a spectrum of a conventional modulated wave signal transmitted from a transmitter unit. The abscissa f indicates frequency, and the ordinate W indicates the power of the conventional modulated wave signal. With a high multilevel QAM wave signal, e.g., 32-level or more, it is very difficult for the receiver unit to extract the reference carrier from the received modulated wave signal, as mentioned previously. The usual practice has been to insert a signal for carrier recovery in the modulated wave signal in the transmitter unit to facilitate recovery of the reference carrier by the receiver unit. The receiver unit can thus reproduce the original digital data signal using the thus easily recovered carrier by means of simple hardware. In this case, it has long been a common practice to insert such a signal for carrier recovery at one or more zero nodes of the spectrum. Accordingly, the frequency of each signal for carrier recovery is necessarily determined to be $(f_O+f_{CL})$ or $(f_O-f_{CL})$, since each zero node stands at such frequency, where the symbol $f_O$ denotes a carrier frequency and $f_{CL}$ a clock frequency with which the digital data signal is clocked. In FIG. 1, there is illustrated, as one example, a signal $C_r$ for carrier recovery, which has been inserted at the zero node of $(f_O+f_{CL})$. Use of a signal $C_r$ is a well-known technique. The insertion of the signal $C_r$ at such a zero node has no deleterious effect on the inherent digital data signal in terms of the signal-to-noise ratio (S/N) and interference from the signal $C_r$. Also, the signal $C_r$ itself suffers from no deleterious interference by the digital data signal component and prevents S/N deterioration, since the signal $C_r$ exists outside the digital data signal band. Incidentally, it is known that each zero node is created periodically depending on the so-called Nyquist rate.

Employment of such a signal $C_r$ inserted at a zero node appearing at the Nyquist rate, however, is not that advantageous for commercially adopted or publicly used radio communication systems in that they do not operate over a sufficiently wide frequency range. They are usually restricted to operating in a relatively narrow range due to national radio laws, such as the Federal Communications Commission (FCC) Part 21.106 Emission limitation, in the U.S.A. and the Radio Regulations by the International Telecommunication Union (ITU) Chapter 1, Article 2, Designation of Emissions, in Europe.

Figure 2:
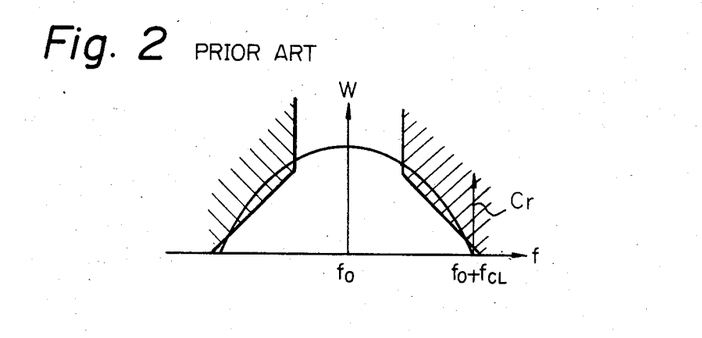
FIG. 2 is a graph of a spectrum of the modulated wave signal for explaining suppression of a signal for carrier recovery by restriction the frequency band.

This makes it difficult to transmit the signal $C_r$ from the transmitter unit to the receiver unit with sufficiently high power. FIG. 2 is a graph of a spectrum of the modulated wave signal for explaining suppression of the signal $C_r$ by restriction of the frequency band. In FIG. 2, the hatching areas represent frequency bands and powers restricted by the radio laws, i.e., prohibited frequency bands and powers. As a result of such restrictions, the signal $C_r$ is masked and cancelled.

According to a first embodiment of the present invention, one or two signals for carrier recovery are inserted in the modulated wave signal with one or two frequencies $(f_O+f'_{CL})$ and $(f_O-f'_{CL})$. The frequency $f'_{CL}$ is defined as $k \cdot f_{CL}$, where the constant k satisfies an inequality $0 < |k| < 1$, i.e., $0 < k < 1$ or $-1 < k < 0$. To be more specific, according to the first embodiment, an insertion circuit is included in the transmitter unit. The insertion circuit creates zero nodes on both sides of the spectrum of the modulated wave signal at frequencies $(f_O+k \cdot f_{CL})$ and $(f_O-k \cdot f_{CL})$ and inserts at least one signal for carrier recovery at either or both of the thus created zero nodes. The creation of the zero nodes can be achieved by means of a filter described below. Thus, in the receiver unit, the original digital data signal is reproduced by using the thus inserted signal or signals for carrier recovery.

Figure 3:
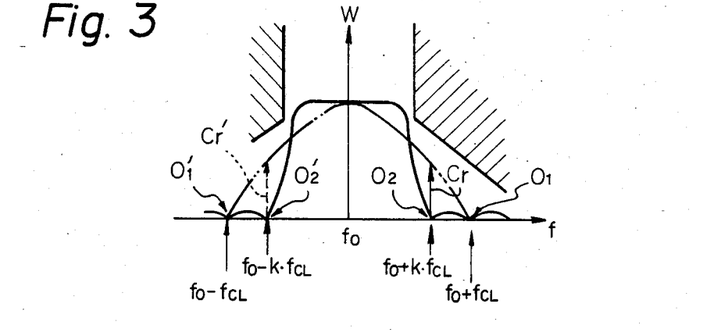
FIG. 3 is a graph of a spectrum of the modulated wave signal for explaining the present invention.

FIG. 3 is a graph of a spectrum of a modulated wave signal for explaining the present invention. In this graph, characters $O_1$ and $O'_1$ denote zero nodes necessarily produced at both sides of the spectrum of the inherent modulated wave signal, i.e., zero nodes which would be produced with the Nyquist rate as illustrated in FIGS. 1 and 2 at frequencies $(f_O+f_{CL})$ and $(f_O-f_{CL})$. Characters $O_2$ and $O'_2$ are zero nodes created deliberately according to the first embodiment. The zero nodes $O_2$ and $O'_2$ are positioned closer to the carrier frequency $f_O$ than the zero nodes $O_1$ and $O'_1$ are, since the zero nodes $O_2$ and $O'_2$ are positioned at frequencies $(f_O+k \cdot f_{CL})$ and $(f_O-k \cdot f_{CL})$, where k satisfies $0 < k < 1$. As is clear from FIG. 3, the signal $C_r$ according to the first embodiment will no longer be masked by the band restriction, i.e., the hatching areas, of the radio laws, since the signal $C_r$ is inserted at frequency $f_O+k \cdot f_{CL}$. Also, the signal for carrier recovery can be inserted at frequency $(f_O-k \cdot f_{CL})$, as indicated by $C'_r$, instead of $C_r$. It is also possible to insert both signals $C_r$ and $C'_r$ simultaneously into the modulated wave signal, since the two zero nodes $O_2$ and $O'_2$ are necessarily created simultaneously at the frequencies $(f_O+k \cdot f_{CL})$ and $(f_O-k \cdot f_{CL})$. This is because, when there is a frequency band restriction on a base band signal, two zero nodes are necessarily produced symmetrically with each other, relative to the frequency $f_O$ as the center, in the modulated wave signal.

The spectrum illustrated in FIG. 3 can be obtained with the use of the previously noted filter. The filter, included in the insertion circuit, can, for example, be a cosine roll-off filter.

Figure 4:
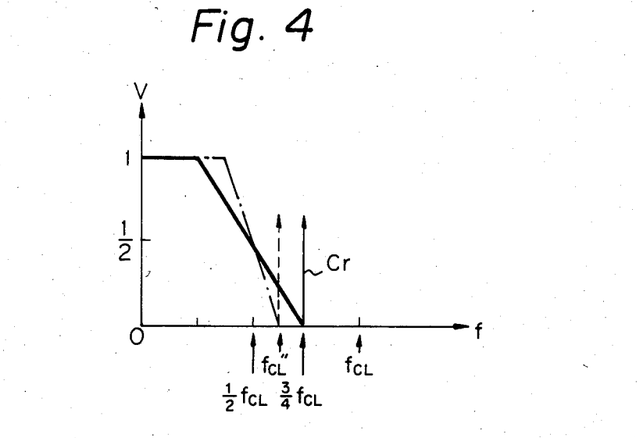
FIG. 4 is a graph exhibiting the characteristics of a cosine roll-off filter.

FIG. 4 is a graph of the characteristics of a cosine roll-off filter. In the graph, the abscissa f indicates a frequency and the ordinate V indicates a voltage. As seen from the graph, a zero node is created at the illustrated point closer to a zero point 0 than the point where the clock frequency $f_{CL}$ is located. Accordingly, the signal $C_r$ is inserted in the transmitter unit at that zero node. Assuming that a roll-off ratio of the cosine roll-off filter is set to be 50%, the zero node is usually created at frequency $\frac{3}{4}f_{CL}$. Therefore, the object of the present invention is attained, i.e., the zero node at the frequency $(f_O+k \cdot f_{CL})$ of FIG. 3 is created by using the frequency $\frac{3}{4}f_{CL}$, illustrated in FIG. 4, existing in the related base band signal, where the constant k is $\frac{3}{4}$. If the frequency $\frac{3}{4}f_{CL}$ is too close to the restriction band (hatching areas), a frequency $f''_{CL}$ of FIG. 4 can be used therefor, since the frequency $f''_{CL}$ is positioned closer to the zero point 0 than is the frequency $\frac{3}{4}f_{CL}$. Such a frequency shift is easily achieved by increasing the roll-off ratio over 50%.

The filter included in the insertion circuit is not limited to the cosine roll-off filters. Other filter may also be used. One type of filter is a partial response transmission line in which equalization is performed to discretely produce so-called intersymbol interferences. Another is a Gaussian-type filter. In any event, the zero node can be created at a frequency $f'_{CL}$ ($=k\cdot f_{CL}$) lower than $f_{CL}$.

Figure 5A:
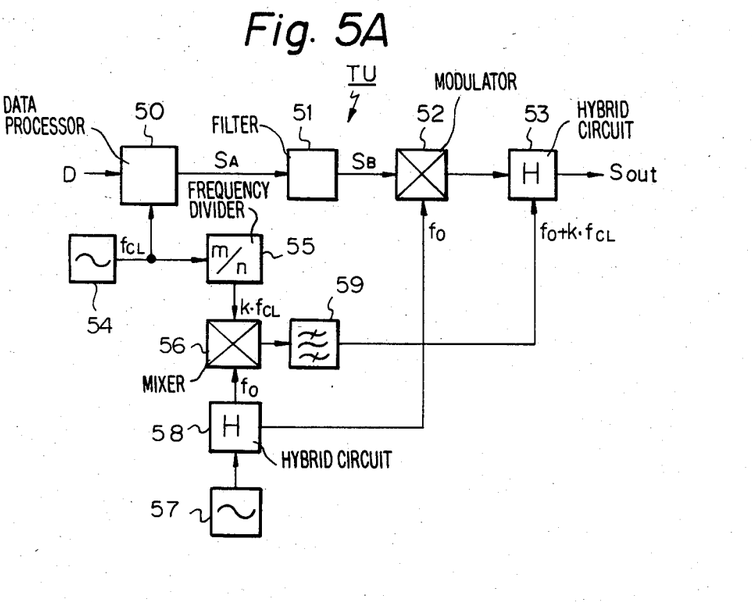
FIG. 5A is a block diagram of an example of a transmitter unit adapted to operate in a radio communication system according to a first embodiment of the present invention.

FIG. 5A is a block diagram of an example of a transmitter unit adapted to operate in a radio communication system according to a first embodiment of the present invention. In the transmitter unit TU, the above-described filter, such as cosine roll-off filter, is represented by a filter (FIL) 51. A digital data signal D to be transmitted is processed in a data processor (DP) 50 to produce an analog data signal $S_A$.

Figure 5B:
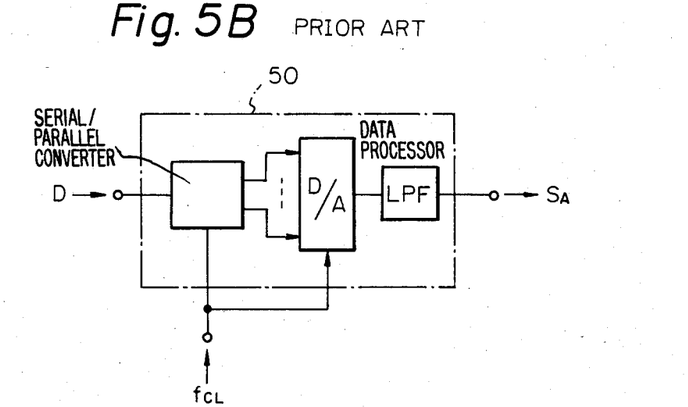
FIG. 5B illustrates the detailed example of a data processor illustrated in FIG. 5A.

FIG. 5B illustrates a detailed example of the data processor 50 of FIG. 5A. In FIG. 5B, the digital data signal D coded by, for example, pulse code modulation (PCM), is supplied in the form of serial data. The serial data D is converted into parallel data by a serial/parallel (S/P) converter. The thus obtained parallel data is transformed into an analog data signal by a digital-/analog (D/A) converter. Then, the analog data signal is produced via a low pass filter (LPF) to obtain the signal $S_A$. The above data processing is clocked by a clock signal having the frequency $f_{CL}$.

Returning to FIG. 5A, the analog data signal $S_A$ is applied to the filter 51, where the aforesaid zero nodes, such as $O_2$ and $O'_2$ in FIG. 3, are created in the spectrum. The thus filtered signal $S_B$ with the zero nodes is input to a modulator 52 and modulated therein with the carrier having the frequency $f_O$. The carrier is supplied to the modulator 52 from a carrier generator 57 via a hybrid circuit 58. The thus modulated signal from the modulator 52 is output as a modulated wave signal $S_{OUT}$ via a hybrid circuit 53. In this case, it is essential to the present invention to insert the signal $C_r$ having the frequency $(f_O+k\cdot f_{CL})$ depicted in FIG. 3 into the modulated wave signal $S_{out}$ at the related zero node.

In the case where the cosine roll-off filter is used as the filter 51, exhibiting the characteristics of FIG. 4, and the roll-off ratio thereof is determined to be 50%, the zero node is created at the frequency $\frac{3}{4}f_{CL}$. For this, a frequency divider (m/n) 55 which has a dividing ratio m/n is employed. The ratio m/n in this case is equal to $\frac{3}{4}$. Thus, a clock signal having the frequency $f_{CL}$ from a clock generator 54 is reduced by multiplying by the ratio m/n to produce a signal having the frequency $k\cdot f_{CL}$, where k corresponds to m/n and in this case is equal to $\frac{3}{4}$. The signal of $k\cdot f_{CL}$ is mixed with the signal of $f_O$ in a mixer 56. Then the mixed signal is input to a band-pass filter 59 to extract the desired signal having the frequency $(f_O+k\cdot f_{CL})$. In the hybrid circuit 53, the filtered signal of $(f_O+k\cdot f_{CL})$ is inserted, as the signal $C_r$, into the corresponding zero node in the spectrum of the modulated wave signal from the modulator 52. As a result, the modulated wave signal $S_{out}$ contains therein the signal $C_r$ which is positioned at a frequency close to the carrier and far from the restriction band, as illustrated by the hatching areas of FIG. 3. The signal $S_{OUT}$ containing the signal $C_r$ is transmitted, via the radio transmission line (not shown), to the receiver unit in which the original digital data is reproduced by utilizing the signal $C_r$.

Figure 6:
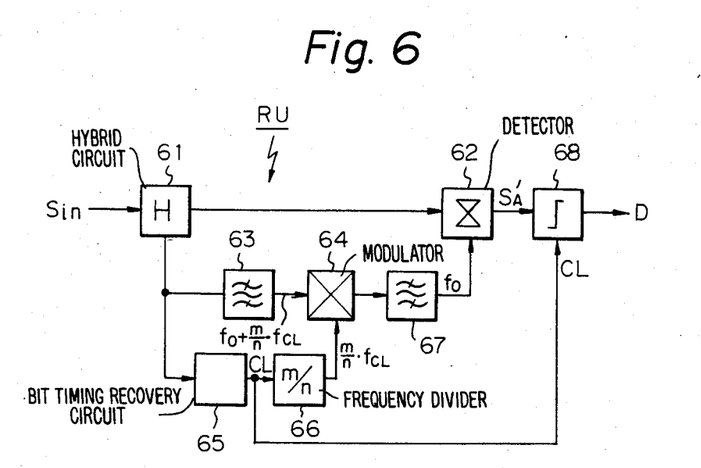
FIG. 6 is a block diagram of a first example of a receiver unit adapted to operate in a radio communication system according to the first embodiment of the present invention.

FIG. 6 is a block diagram of a first example of a receiver unit adapted to operate in the radio communication system according to the first embodiment of the present invention. The receiver unit RU receives the modulated wave signal as a signal $S_{in}$, produced as $S_{out}$ from the transmitter unit TU of FIG. 5. The signal $S_{in}$ is supplied, via hybrid circuit 61, to a detector 62 and mixed therein with the reference carrier having the frequency of $f_O$ to demodulate and reproduce an analog data signal $S'_A$ corresponding to the signal $S_A$ of FIG. 5. The analog data signal $S'_A$ is input to a comparator 68 to produce the original digital data signal D in synchronism with a clock signal CL.

The point here is how the carrier of $f_O$, which is to be supplied to the detector 62, is recovered. The modulated wave signal $S_{in}$ contains therein the signal $C_r$ of $(f_O+m/n\cdot f_{CL})$. The signal $C_r$ is extracted by means of a band-pass filter 63, which is tuned with the frequency $(f_O+m/n\cdot f_{CL})$. The thus filtered signal of $(f_O+m/n\cdot f_{CL})$ is given to a modulator 64 at one of its inputs. The modulated wave signal $S_{in}$, meanwhile is input to a known bit timing recovery circuit (BTR) 65 via the hybrid circuit 61. The BTR 65 recovers the clock signal CL having the clock frequency $f_{CL}$. Since the modulated wave signal $S_{in}$ has been band-restricted beforehand at the base band stage and then modulation operation achieved, the signal CL can easily be recovered by detecting the periodic change of the so-called eye pattern of the signal $S_{in}$. The signal CL is input to a frequency divider 66 identical to the divider 55 of FIG. 5 and having the same dividing ratio of m/n. In this example, the ratio m/n is here $\frac{3}{4}$. Therefore, the signal of $\frac{3}{4}f_{CL}$ can be recovered thereby. The signal of m/n·$f_{CL}$ ($=\frac{3}{4}f_{CL}$) is supplied to the modulator 64 at its other input, so that the signal of $(f_O+m/n\cdot f_{CL})$ from the filter 63 is modulated with the thus obtained signal of m/n·$f_{CL}$ from the divider 66. The thus modulated signal contains two modulation signals, one with a frequency $f_O$ ($=f_O+m/n\cdot f_{CL}-m/n\cdot f_{CL}$) and the other with a frequency of $(f_O+2m/n\cdot f_{CL})$ ($=f_O+m/n\cdot f_{CL}+m/n\cdot f_{CL}$). The latter modulation signal of $f_O+2m/n\cdot f_{CL}$ is cancelled by means of a band-pass filter 67 to obtain the desired carrier of $f_O$ therefrom. The modulated wave signal $S_{in}$ is synchronously detected using the carrier having frequency $f_o$ in the detector 62 to produce the analog data signal $S'_A$.

Figure 7:
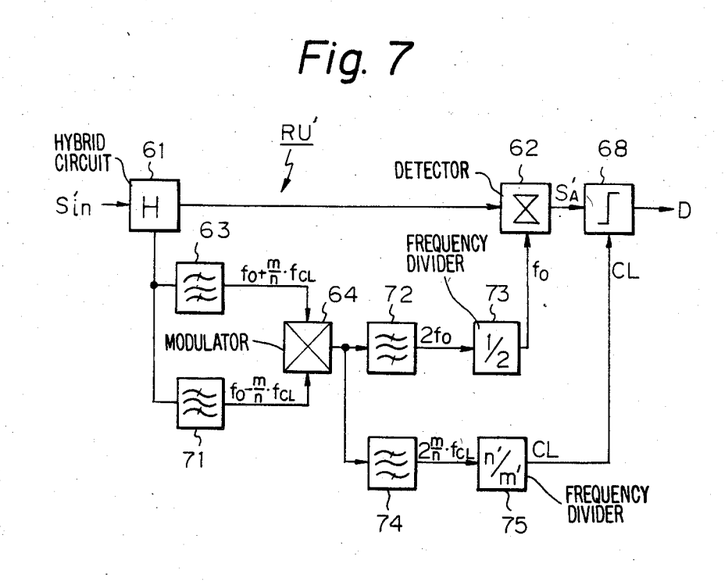
FIG. 7 is a block diagram of a second example of a receiver unit adapted to operate in a radio communication system according to the first embodiment of the present invention.

FIG. 7 is a block diagram of a second example of a receiver unit adapted to operate in the radio communication system according to the first embodiment of the present invention. The receiver unit RU' receives the modulated wave signal $S'_{in}$ which simultaneously contains the signal $C_r$ and $C'_r$, both depicted in FIG. 3. The signal $C'_r$ has the frequency $(f_O-m/n\cdot f_{CL})$. In this regard, the transmitter unit TU of FIG. 5A must be modified to be the unit TU' as illustrated in FIG. 5C.

Figure 5C:
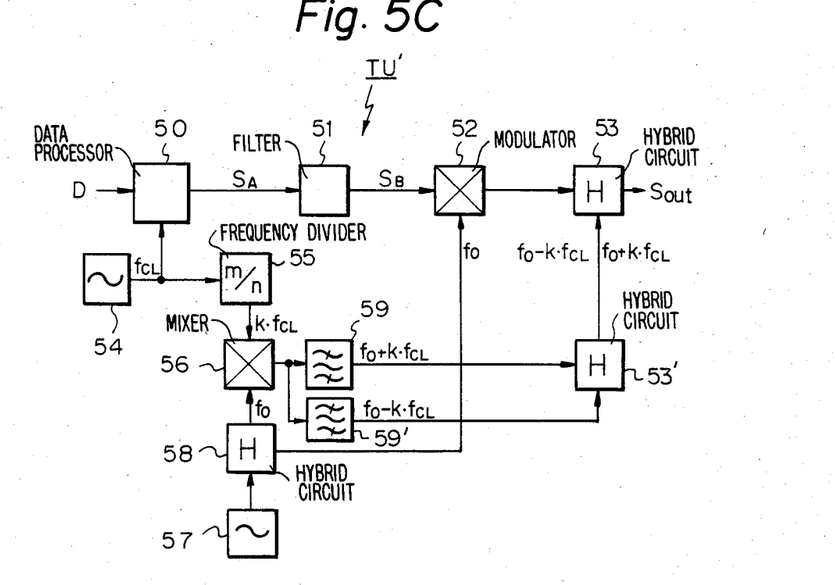
FIG. 5C is a block diagram of an example of a transmitter unit to be used with a receiver unit illustrated in FIG. 7.

FIG. 5C is a block diagram of an example of a transmitter unit to be used with the receiver unit RU' illustrated in FIG. 7. The differences between FIG. 5A and FIG. 5C are that another band-pass filter 59' and another hybrid circuit 53' are included in FIG. 5C. The filter 59' provides the signal $C'_r$ having the frequency $(f_O-m/n\cdot f_{CL})$. The signal $C'_r$ is added to the signal $C_r$ of frequency $(f_O+m/n\cdot f_{CL})$ in the circuit 53'.

Returning to FIG. 7 again, the receiver unit RU' operates in a manner similar to the receiver unit RU of FIG. 6, wherein the modulated wave signal $S'_{in}$ is synchronously detected by the carrier of $f_O$ and decoded thereby, so that the analog data signal $S'_A$ is reproduced and, thereafter, the original digital data signal D is obtained. The carrier of $f_O$, however, is recovered under an operation different from that in the receiver unit RU of FIG. 6. That is, the modulated wave signal $S'_{in}$ is first branched into two signals in the hybrid circuit 61. One signal is applied to the detector 62, as in the receiver unit RU. The other is applied to both band-pass filters 63 and 71 simultaneously. The filter 63 extracts the signal $C_r$ of $(f_O+m/n\cdot f_{CL})$, as in the receiver unit RU, while the filter 71 extracts the signal $C'_r$ of $(f_O-m/n \cdot f_{CL})$. These filtered signals $C_r$ and $C'_r$ are mixed in the modulator 64 to produce two modulation signals, one with a frequency $2f_O$ $(=f_O+m/n \cdot f_{CL}+f_O-m/n \cdot f_{CL})$ and the other with a frequency $2m/n \cdot f_{CL}$ $(=f_O+m/n \cdot f_{CL}-f_O+m/n \cdot f_{CL})$. These two modulation signals are separated by band-pass filters 72 and 74, which are tuned with the frequencies $2f_O$ and $2m/n \cdot f_{CL}$, respectively. Therefore, filtered modulation signal of $2f_O$ and of $2m/n \cdot f_{CL}$ are provided from individual filters 72 and 74. The signal of $2f_O$ is halved in frequency by a frequency divider 73 having a dividing ratio $\frac{1}{2}$. Accordingly, a carrier of $f_O$ is obtained therefrom. The signal of $2m/n \cdot f_{CL}$ is divided in frequency by a frequency divider 75 having a dividing ratio $n'/m'$, which is determined as $\frac{1}{2} \times n/m$. If $m/n$ is set to $\frac{3}{4}(k=m/n=\frac{3}{4})$, the ratio $n'/m'$ will be $\frac{2}{3}$. Accordingly, a clock signal CL having the frequency of $f_{CL}$ is obtained $(2 \times \frac{3}{4} f_{CL} \times \frac{2}{3} = 1 \times f_{CL})$.

The receiver unit RU' has advantages over the receiver unit RU in that the unit RU' does not need the bit timing recovery circuit 65. Therefore, the unit RU' can be manufactured less expensively. Conversely, the unit RU' can only be used with the transmitter unit TU' of FIG. 5C, which employs the additional filter 59' and hybrid circuit 53' not needed in the transmitter unit TU of FIG. 5A. Further, a radio communication system comprised of transmitter unit TU' has the disadvantage of a lower transmission power of the inherent data signal due to the power consumed in transmitting the signal $C'_r$ in addition to the power for the signal $C_r$. Consequently, a radio communication system comprised of TU' and RU' is basically advantageous only in a system using a plurality of identical receiver units in the sense of allowing reduction of manufacturing costs.

A radio communication system according to a second embodiment of the present invention is described below. According to the second embodiment, both the signals $C_r$ and $C'_r$ are forcibly inserted inside the modulated wave signal without creating the aforesaid zero nodes, e.g., $O_2$ and $O'_2$ depicted in FIG. 3. It is commonly accepted that insertion of the signals $C_r$ and $C'_r$ into the inherent data signal is not beneficial in that it deteriorates the S/N. Even so, in a radio communication system operated under a QAM method of 32-level or higher, it is more important to ensure recovery of the carrier than to maintain the S/N at a high level. This will be clarified briefly with reference to FIGS. 8A and 8B.

Figure 8A:
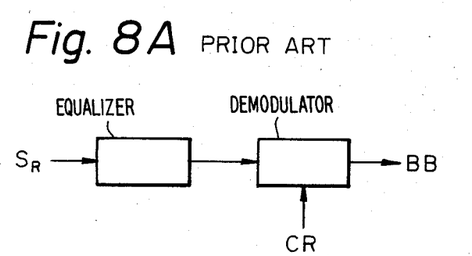
FIG. 8A is a simple block diagram of a conventional receiver unit to which the principle of the present invention cannot be adopted.
Figure 8B:
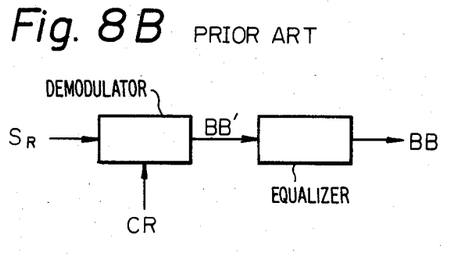
FIG. 8B is a simple block diagram of a conventional receiver unit to which the principle of the present invention can be adopted.

FIGS. 8A and 8B are simple block diagrams of conventional receiver units to which the principle of the present invention cannot and can be adopted, respectively. In FIGS. 8A and 8B, each block EQ represents an equalizer and each block DEM represents a demodulator. If the received signal $S_R$ contains no signals ($C_r$, $C'_r$), as usual, the equalizer EQ must be of high quality and capability in order to ensure recovery of the carrier CR under the aforesaid multiply method from the signal $S_R$ when the receiving signal $S_R$ is distorted. However, such a high quality equalizer is very expensive, since it works in an intermediate frequency range, i.e., high frequency range. To make matters worse, if the equalizer EQ fails to assist the recovery of the carrier CR, no base band signal BB is reproduced. Therefore, it is necessary to give highest priority to recovery of the carrier CR.

According to the present invention, although the receiving signal $S_R$ of FIG. 8B has a poor S/N due to the presence of the signals $C_r$ and $C'_r$, recovery of the carrier CR is ensured because the carrier component is forcibly inserted beforehand, in the transmitter, into the signal $S_R$. Therefore the demodulator DEM of FIG. 8B can reliably produce, with the use of the carrier, the base band signal BB' of FIG. 8B. However, the signal BB' has a poor S/N due to the insertion of the signals $C_r$ and $C'_r$. Therefore, the equalizer EQ of FIG. 8B also must be of a high quality in order to correctly equalize the signal BB'. In this case, however, it is not necessary to have such a high quality and capability as the equalizer EQ of FIG. 8A. This is because the equalizer EQ of FIG. 8B works in a base band frequency range, i.e., low frequency range. As a result, in the second embodiment of the present invention, the disadvantage of deterioration of the S/N is completely cancelled by the advantage of ensuring the recovery of the carrier.

Figure 9:
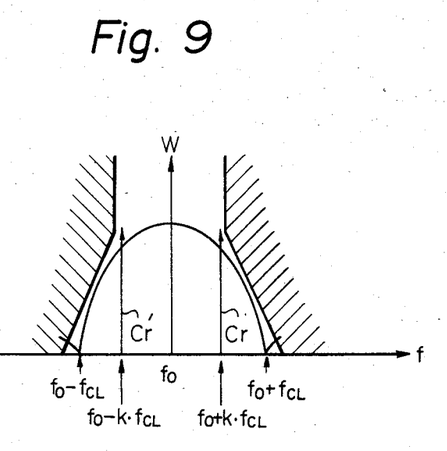
FIG. 9 is a graph of a spectrum of the modulated wave signal for explaining a second embodiment of the present invention.

FIG. 9 is a graph of a spectrum of the modulated wave signal for explaining the second embodiment of the present invention. As seen from the graph, two signals $C_r$ and $C'_r$ are forcibly inserted inside the signal band. The signal $C_r$ has a frequency $(f_O+k \cdot f_{CL})$, and the signal $C'_r$ has a frequency $(f_O-k \cdot f_{CL})$, where k is determined as $1/N$. The constant N is a positive number larger than 1, preferably an even number such as 2, 4, and 6. The following explanations will primarily be made by taking as an example a case where N is 2, i.e., $k=1/N=\frac{1}{2}$.

Figure 10:
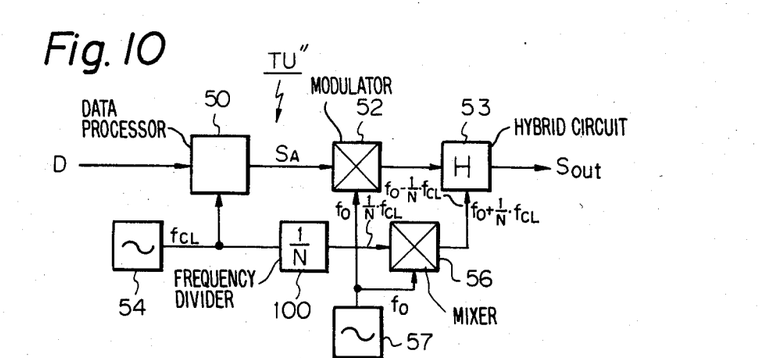
FIG. 10 is a block diagram of an example of a transmitter unit adapted to operate in a radio communication system according to the second embodiment of the present invention.

FIG. 10 is a block diagram of an example of a transmitter unit TU" adapted to operate in a radio communication system according to the second embodiment of the present invention. In the transmitter unit TU", a frequency divider 100 has been added. The divider 100 is substantially identical to the divider 55 illustrated in FIGS. 5A and 5C. The divider 100 has a dividing ratio $1/N$ ($N=2$). The operations are substantially the same as those achieved in the transmitter units TU and TU' explained previously. The mixer 56 produces the signal $C_r$ of $(f_O+1/N \cdot f_{CL})$ and the signal $C'_r$ of $(f_O-1/N \cdot f_{CL})$. The hybrid circuit 53 produces the modulated wave signal $S_{out}$ having the spectrum depicted in FIG. 9.

Figure 11:
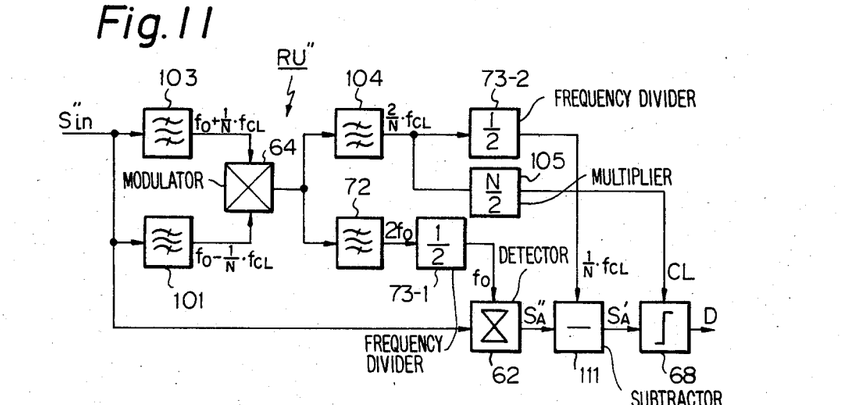
FIG. 11 is a block diagram of one example of a receiver unit adapted to operate in a radio communication system according to the second embodiment of the present invention.

FIG. 11 is a block diagram of one example of a receiver unit adapted to operate in the radio communication system according to the second embodiment of the present invention. The receiver unit RU" receives the modulated wave signal as a signal $S''_{in}$, produced as $S_{out}$ from the transmitter unit TU" of FIG. 10. The operations of the unit RU" are basically the same as those performed in the receiver unit RU' of FIG. 7. The modulated wave signal $S''_{in}$ is input to a band-pass filter 103 (corresponding to the filter 63 of FIG. 7), a band-pass filter 101 (corresponding to the filter 71 of FIG. 7), and the detector 62. The filters 103 and 101 are tuned with the frequencies $(f_O+1/N \cdot f_{CL})$ and $(f_O-1/N \cdot f_{CL})$, respectively. Then, the modulator 64 produces two modulation signals, one with a frequency $2f_O$ $(=f_O+1/N \cdot f_{CL}+f_O-1/N \cdot f_{CL})$, and the other with a frequency $2(1/N) \cdot f_{CL}$ $(=f_O+1/N \cdot f_{CL}-f_O+1/N \cdot f_{CL})$. These two modulation signals are separated by band-pass filters 72 and 104 (corresponding to the filter 74 of FIG. 7) which are tuned with the frequencies $2f_O$ and $2(1/N) \cdot f_{CL}$, respectively. Thereby, a signal of $2f_O$ and a signal of $2(1/N) \cdot f_{CL}$ are provided from individual filters 72 and 104. The signal of $2f_O$ is halved in frequency by a frequency divider 73-1 having a dividing ratio $\frac{1}{2}$. Accordingly, a carrier of $f_O$ is obtained therefrom. The signal of $2(1/N) \cdot f_{CL}$ is multiplied in frequency by an N/2 multiplier 105 (corresponding to the divider 75 of FIG. 7) having a multiplying ratio N/2, and thereby the clock signal CL of $f_{CL}$ is recovered. It should be understood that, when the number N is set as 2, and N/2 multiplier has substantially no effect, because the input is multiplied by 1. That is, the N/2 multiplier 105 is not needed if N=2. When N equals, for example, 4, the N/2 multiplier 105 produces an output with a frequency twice that of the input.

The signal of $2/N \cdot f_{CL}$ from the filter 104 is halved in frequency by a frequency divider 73-2 having a dividing ratio ½, to produce a signal having a frequency $1/N \cdot f_{CL}$. The signal of $1/N \cdot f_{CL}$ is supplied to a substractor 111 which receives an analog data signal $S''_A$. It should be noted that, in the detector (or modulator) 62, the modulated wave signal $S''_{in}$ is synchronously detected with the recovered carrier of $f_O$ to produce the signal $S''_A$, however, the signal $S''_A$ is not yet a signal suitable for reproducing the original digital data D. This is because, the signal $S''_A$ from the detector 62 is not stable, but is periodically changed with an offset frequency, which is the same as the frequency of the offset frequency component, i.e., $1/N \cdot f_{CL}$ of each signal ($C_r$ and $C'_r$) for carrier recovery. In order to cancel the change by the offset frequency component $1/N \cdot f_{CL}$, the signal of $1/N \cdot f_{CL}$ from the frequency divider 73-2 is subtractively combined with the signal $S''_A$ at the subtractor 111 to obtain the signal $S'_A$. The subtractor 111 is described briefly below.

Figure 12:
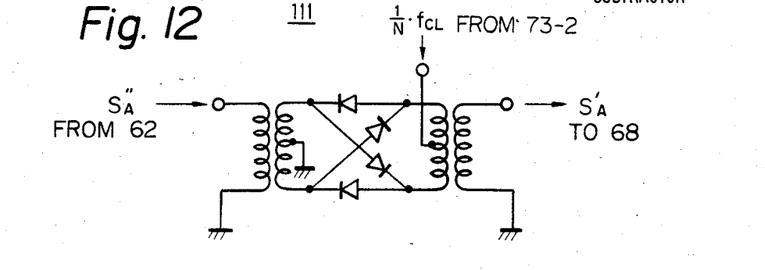
FIG. 12 is a detailed circuit diagram of an example of the subtractor illustrated in FIG. 11.

FIG. 12 is a detailed circuit diagram of an example of the subtractor 111 illustrated in FIG. 11. As apparent from FIG. 12, the subtractor 111 can be constructed as a conventional keying circuit, such as a ring modulator (RM). The phase of the signal $S''_A$ is reversed by 180° in accordance with the frequency $1/N \cdot f_{CL}$, and the signal $S''_A$ is smoothed to form the desired signal $S'_A$.

As mentioned above in detail, the present invention provides a radio communication system operated under a QAM method of 32-level or higher, in which recovery of the carrier signal can be ensured in the receiver.

We claim:

1. A double sideband radio communication system operated under a quadrature amplitude modulation (QAM) method and communicating via a radio transmission path, said system comprising:

a transmitter unit, including a clock generator operating at a clock frequency $f_{CL}$, for modulating a digital data signal, clocked at the clock frequency $f_{CL}$, with a carrier signal having a carrier frequency $f_O$ and for transmitting a modulated wave signal over the radio transmission path, said transmitter unit comprising insertion means for inserting a signal for carrier recovery into the modulated wave signal, said insertion means including a filter operatively connected to the radio transmission path and to receive the digital data signal, the signal for carrier recovery having a recovery frequency defined, using a constant k times the clock frequency, as $(f_O + k \cdot f_{CL})$, where an inequality of $0 < |k| < 1$ is satisfied, the filter creating zero nodes in the modulated wave signal at the recovery frequency $(f_O + k \cdot f_{CL})$ for positive and negative values of the constant k and said inserting means inserting the signal for carrier recovery in at least one of the zero nodes; and a receiver unit for receiving a received modulated wave signal, including:

extraction means, operatively connected to the radio transmission path, for extracting received frequency components $(f_O + k \cdot f_{CL})$;

separation means, operatively connected to said extraction means, for separating received carrier frequency and received clock frequency components $(f_O + k \cdot f_{CL})$ from the received frequency components;

recovery means, operatively connected to said separation means, for recovering the clock frequency $f_{CL}$ from the received clock frequency component $k \cdot f_{CL}$; and reproducing means, operatively connected to said separation means, said recovery means and to receive the received modulated wave signal, for reproducing the digital data signal from the received modulated wave signal, the received carrier frequency component $f_O$ and the clock frequency $f_{CL}$.

2. A system as set forth in claim 1, wherein said insertion means inserts a first signal for carrier recovery having a frequency $(f_O + k \cdot f_{CL})$ and a second signal for carrier recovery having a frequency $(f_O - k \cdot f_{CL})$, where the constant k is determined as $1/N$ and N is a positive number larger than one.

3. A system as set forth in claim 2, wherein said insertion means comprises:

a clock generator for generating a first clock signal with the clock frequency;

a carrier generator for generating the carrier signal;

a first frequency divider, operatively connected to receive the digital data signal, having a dividing ratio $1/N$, receiving the first clock signal of $f_{CL}$ from said clock generator and producing a second clock signal of $1/N \cdot f_{CL}$;

a mixer, operatively connected to said carrier generator and said first frequency divider, receiving the second clock signal of $1/N$ $f_{CL}$ and the carrier signal from said carrier generator and producing the first and second signals for carrier recovery of $(f_O + 1/N \cdot f_{CL})$ and $(f_O - 1/N \cdot f_{CL})$ simultaneously;

converting means, operatively connected said clock generator and to receive the digital data signal, for converting the digital data to an analog signal;

a first modulator, operatively connected to said carrier generator and said converting means, receiving the carrier signal of $f_O$ from said carrier generator and the analog signal and producing the modulated wave signal; and a hybrid circuit, operatively connected to said mixer and said first modulator, for inserting the signals for carrier recovery of $(f_O + 1/N \cdot f_{CL})$ and $(f_O - 1/N \cdot f_{CL})$ into the modulated wave signal and transmitting the modulated wave signal to said receiver unit over the radio transmission path.

4. A system as set forth in claim 1, wherein said filter comprises a cosine roll-off filter, the constant k being determined by a roll-off ratio of said cosine roll-off filter.

5. A system as set forth in claim 1, wherein said filter comprises a Gaussian-type filter.

6. A system as set forth in claim 1, wherein said filter comprises a partial response transmission line in which equalization is performed to discretely produce intersymbol interferences.

7. A double sideband radio communication system operated under a quadrature amplitude modulation method and communicating via a radio transmission path, said system comprising:

a transmitter unit, including a clock generator operating at a clock frequency $f_{CL}$, for modulating a digital data signal, clocked at the clock frequency $f_{CL}$, with a carrier signal having a carrier frequency $f_O$ and for transmitting a modulated wave signal over the radio transmission path, said transmitter unit comprising insertion means for inserting a signal for carrier recovery into the modulated wave signal, said insertion means including a filter, operatively connected to the radio transmission path and to receive the digital data signal, for producing a filtered signal with at least one zero node at a recovery frequency $(f_O + k \cdot f_{CL})$, where $0 < |k-|<1$, the signal for carrier recovery having the recovery frequency, said inserting means inserting the signal for carrier recovery in at least one of the zero nodes; and a receiver unit for receiving a received modulated wave signal, including:
 extraction means, operatively connected to the radio transmission path, for extracting received frequency components $(f_O + k \cdot f_{CL})$;
 separation means, operatively connected to said extraction means, for separating received carrier frequency and received clock frequency components $(f_O + k \cdot f_{CL})$ from the received frequency components;
 recovery means, operatively connected to said separation means, for recovering the clock frequency $f_{CL}$ from the received clock frequency component $k \cdot f_{CL}$; and
 reproducing means, operatively connected to said separation means, said recovery means and to receive the received modulated wave signal, for reproducing the digital data signal from the received modulated wave signal, the received carrier frequency component $f_O$ and the clock frequency $f_{CL}$.

8. A system as set forth in claim 7, wherein said insertion means further comprises:
 a first modulator, operatively connected to said filter and to receive the carrier signal, for modulating the filtered signal from said filter with the carrier signal of $f_O$; and
 a hybrid circuit, operatively connected to said first modulator and to receive the signal for carrier recovery of $(f_O + k \cdot f_{CL})$ for producing the modulated wave signal.

9. A system as set forth in claim 8, wherein the constant k is m/n, where m and n are positive integers and m<n is satisfied.

10. A system as set forth in claim 9, wherein said insertion means further comprises:
 a clock generator for generating a first clock signal with the clock frequency;
 a carrier generator for generating the carrier signal;
 a frequency divider, operatively connected to said clock generator, having a dividing ratio m/n and producing a second clock signal of $m/n \cdot f_{CL}$;
 a mixer operatively connected to said frequency divider and said carrier generator; and
 a band-pass filter, operatively connected to said mixer and said hybrid circuit, for producing the signal for carrier recovery of $(f_O + m/n \cdot f_{CL})$ to be input to said hybrid circuit.

11. A system as set forth in claim 9, wherein said extraction means comprises a first band-pass filter, operatively connected to the radio transmission path, for extracting the received frequency components $(f_O + f_{CL})$ from the received modulated wave signal, said first band-pass filter being tuned with a component frequency of $(f_O + m/n \cdot f_{CL})$, wherein said recovery means comprises a bit timing recovery circuit, operatively connected to the radio transmission path to receive the received modulated wave signal, for recovering the first clock signal of $f_{CL}$, and wherein said separation means comprises:
 a frequency divider, operatively connected to said bit recovery circuit, having a dividing ratio m/n and reproducing the second clock signal of $m/n \cdot f_{CL}$;
 a second modulator, operatively connected to said first band-pass filter and said frequency divider, for modulating the signal for carrier recovery of $(f_O + m/n \cdot f_{CL})$ from said first band-pass filter of said extracting means with the second clock signal of $m/n \cdot f_{CL}$ from said frequency divider of m/n and producing two modulation signals of $f_O$ and $(f_O + 2m/n \cdot f_{CL})$; and
 a second band-pass filter, operatively connected to said second modulator for extracting one of the two modulation signals as the received carrier frequency component $f_O$.

12. A system as set forth in claim 7, wherein the signal for carrier recovery includes two signals for carrier recovery of $(f_O + k \cdot f_{CL})$ and $(f_O - k \cdot f_{CL})$ and said insertion means further comprises:
 a modulator, operatively connected to said filter and to receive the carrier signal, for modulating the filtered signal from said filter with the carrier signal of $f_O$; and
 a hybrid circuit, operatively connected to said modulator and to receive the two signals for carrier recovery of $(f_O + k \cdot f_{CL})$ and $(f_O - k \cdot f_{CL})$ for producing the modulated wave signal.

13. A system as set forth in claim 8, wherein the constant k is m/n, where m and n are positive integers and m<n is satisfied.

14. A system as set forth in claim 13, wherein the signal for carrier recovery includes two signals for carrier recovery of $(f_O + k \cdot f_{CL})$ and $(f_O - k \cdot f_{CL})$ and said insertion means further comprises:
 a clock generator for generating a first clock signal with the clock frequency;
 a carrier generator for generating the carrier signal;
 a frequency divider, operatively connected to said clock generator, having a dividing ratio m/n and producing a second clock signal of $f_{CL}$;
 a mixer operatively connected to said frequency divider and said carrier generator; and
 first and second band-pass filters, operatively connected to said mixer and said hybrid circuit, for producing the two signals for carrier recovery of $(f_O + m/n \cdot f_{CL})$ and $(f_O - m/n \cdot f_{CL})$, respectively, to be input to said hybrid circuit.

15. A double sideband radio communication system operated under a quadrature amplitude modulation method and communicating via a radio transmission path, said system comprising:
 a transmitter unit, including a clock generator operating at a clock frequency $f_{CL}$, for modulating a digital data signal, clocked at the clock frequency $f_{CL}$, with a carrier signal having a carrier frequency $f_O$ and for transmitting a modulated wave signal over the radio transmission path, said transmitter unit comprising insertion means for inserting a signal for carrier recovery into the modulated wave signal, the signal for carrier recovery having a recovery frequency ($f_O+m/n\cdot f_{CL}$), where m and n are positive integers and m<n, said insertion means comprising:

a filter, operatively connected to receive the digital data signal, for producing a filtered signal with at least one zero node at the recovery frequency;

a first modulator, operatively connected to said filter and to receive the carrier signal, for modulating the filtered signal from said filter with the carrier signal of $f_O$; and a hybrid circuit, operatively connected to said first modulator and to receive the signal for carrier recovery, for producing the modulated wave signal; and a receiver unit for receiving a received modulated wave signal, comprising:

extraction means for extracting received frequency components ($f_O\pm m/n\cdot f_{CL}$), said extraction means including first and second band-pass filters, operatively connected to the radio transmission path, for extracting filtered signal of ($f_O+m/n\cdot f_{CL}$), and ($f_O-m/n\cdot f_{CL}$), respectively, from the received modulated wave signal, said first and second band-pass filters being tuned with component frequencies of ($f_O+m/n\cdot f_{CL}$) and ($f_O-m/n\cdot f_{CL}$), respectively;

separation means for separating received carrier frequency and received clock frequency components ($f_O\pm m/n\cdot f_{CL}$) from the received frequency components, said separation means comprising:

a modulator, operatively connected to said first and second band-pass filters to receive the filtered signals of ($f_O+m/n\cdot f_{CL}$) and ($f_O-m/n\cdot f_{CL}$) from said first and second band-pass filters, for producing two modulation signals of $2f_O$ and $2m/n\cdot f_{CL}$;

third and fourth band-pass filters, operatively connected to said modulator, for extracting the two modulation signals of $2f_O$ and $2m/n\cdot f_{CL}$, respectively, from each other; and a first frequency divider, operatively connected to said third band-pass filter and said reproducing means, having a dividing ratio of 1/2, receiving the filtered signal of $2f_O$ and recovering the carrier signal of $f_O$;

recovery means for recovering the clock frequency $f_{CL}$ from the received clock frequency component $k\cdot f_{CL}$, said recovery means comprising a second frequency divider, operatively connected to said fourth band-pass filter and said reproducing means, having a dividing ratio of 2m/n, receiving the filtered signal of $2m/n\cdot f_{CL}$ and recovering the first clock signal of $f_{CL}$; and reproducing means, operatively connected to said first and second frequency dividers and to receive the received modulated wave signal, for reproducing the digital data signal from the received modulated wave signal, the received carrier frequency component $f_O$ and the clock frequency $f_{CL}$.

16. A double sideband radio communication system operated under a quadrature amplitude modulation method and communicating via a radio transmission path, said system comprising:

a transmitter unit, for modulating a digital data signal to form a modulated wave signal and for transmitting the modulated wave signal over the radio transmission path, said transmitter unit including insertion means for inserting a first signal for carrier recovery having a first frequency ($f_O+1/N\cdot f_{CL}$) and a second signal for carrier recovery having a second frequency ($f_O-1/N\cdot f_{CL}$), where N is a positive number larger than one, said insertion means comprising:

a clock generator for generating a first clock signal with a clock frequency $f_{CL}$;

a carrier generator for generating a carrier signal having a carrier frequency $f_O$;

a first frequency divider, operatively connected to receive the digital data signal, having a dividing ratio 1/N, receiving the first clock signal of $f_{CL}$ from said clock generator and producing a second clock signal of $1/N\cdot f_{CL}$;

a mixer, operatively connected to said carrier generator and said first frequency divider, receiving the second clock signal of $1/N\cdot f_{CL}$ and the carrier signal from said carrier generator and producing the first and second signals for carrier recovery of ($f_O+1/N\cdot f_{CL}$) and ($f_O-1/N\cdot f_{CL}$) simultaneously;

converting means, operatively connected to said clock generator and to receive the digital data signal, for converting the digital data to an analog signal;

a first modulator, operatively connected to said carrier generator and said converting means, receiving the carrier signal of $f_O$ from said carrier generator and the analog signal and producing the modulated wave signal; and a hybrid circuit, operatively connected to said mixer and said first modulator, for inserting the signals for carrier recovery of ($f_O+1/N\cdot f_{CL}$) and ($f_O-1/N\cdot f_{CL}$), into the modulated wave signal and transmitting the modulated wave signal to said receiver unit over the radio transmission path; and a receiver unit for receiving a received modulated wave signal, comprising:

extraction means for extracting received carrier frequency and received clock frequency components ($f_O+1/N\cdot f_{CL}$), from the received frequency components, said extraction means including first and second band-pass filters, operatively connected to the radio transmission path, for filtering filtered signals of ($f_O+1/N\cdot f_{CL}$) and ($f_O-1/N\cdot f_{CL}$), from the received modulated wave signal, said first and second band-pass filters being tuned with the frequencies ($f_O+1/N\cdot f_{CL}$), and ($f_O-1/N\cdot f_{CL}$) respectively;

separation means for separating received carrier frequency and received clock frequency components ($f_O+1/N\cdot f_{CL}$) from the received frequency components, said separation means comprising:

a second modulator, operatively connected to said first and second band-pass filters, receiving the filtered signals of ($f_O+1/N\cdot f_{CL}$) and ($f_O-1/N\cdot f_{CL}$), from said first and second band-pass filters and producing two modulation signals of $2f_O$ and $2(1/N)\cdot f_{CL}$;

third and fourth band-pass filters, operatively connected to said second modulator, for separating the two modulation signals of $2f_O$ and $2(1/N) \cdot f_{CL}$ from each other, said third and fourth band-pass filters being tuned with the frequencies $2f_O$ and $2(1/N) \cdot f_{CL}$, respectively; and a second frequency divider, operatively connected to said third band-pass filter and said reproducing means, having a dividing ratio of 1/2, receiving the modulation signal of $2f_O$ and recovering the carrier signal of $f_O$;

recovery means for recovering the clock frequency of $f_{CL}$ from the received clock frequency component $1N \cdot f_{CL}$, said recovery means comprising an N/2 multiplier, operatively connected to said fourth band-pass filter, receiving the modulation signal of $2(1/N) \cdot f_{CL}$ and recovering the first clock signal of $f_{CL}$; and reproducing means, operatively connected to said second frequency divider, said N/2 multiplier and to receive the received modulated wave signal, for recovering the digital data signal from the received modulated wave signal using the carrier signal $f_O$ and the first clock signal $f_{CL}$ from the received modulated wave signal.

17. A system as set forth in claim 16, wherein said reproducing means comprises:

a third modulator, operatively connected said second frequency divider and the radio transmission path, receiving the received modulated wave signal and the carrier signal of $f_O$ and producing a modulated output signal;

a third frequency divider, operatively connected to said fourth band-pass filter, receiving the modulation signal of $2(1/N)f_{CL}$ from said fourth band-pass filter and producing an offset frequency signal of $1/N \cdot f_{CL}$; and a subtractor, operatively connected to said third modulator and said third frequency divider, subtractively combining the modulated output signal from said third modulator and the offset frequency signal and reproducing the analog signal, said reproducing means using the analog signal and the first clock signal of $f_{CL}$ for reproducing the digital data signal.

18. A system as set forth in claim 17, wherein said subtractor comprises a ring modulator operatively connected to said third modulator and said third frequency divider.

* * * * *